United States Patent
Nevotne et al.

(10) Patent No.: US 12,469,274 B2
(45) Date of Patent: Nov. 11, 2025

(54) TEXT-TO-VIDEO CONVERSION

(71) Applicant: Valoi.ai, Chicago, IL (US)

(72) Inventors: Tristan Brady Nevotne, Chicago, IL (US); Fnu Shivam, Morgantown, WV (US); Davio Alexandre Cianci, Chicago, IL (US)

(73) Assignee: Valoi.ai, Chicago, IL (US)

( * ) Notice: Subject to any disclaimer, the term of this patent is extended or adjusted under 35 U.S.C. 154(b) by 0 days.

(21) Appl. No.: 19/188,774

(22) Filed: Apr. 24, 2025

(65) Prior Publication Data

US 2025/0336199 A1    Oct. 30, 2025

Related U.S. Application Data

(60) Provisional application No. 63/640,692, filed on Apr. 30, 2024.

(51) Int. Cl.
*G06F 40/20* (2020.01)
*G06F 11/34* (2006.01)
*G06V 10/82* (2022.01)

(52) U.S. Cl.
CPC ......... *G06V 10/82* (2022.01); *G06F 11/3438* (2013.01); *G06F 40/20* (2020.01)

(58) Field of Classification Search
CPC .................................................. G06V 20/46
See application file for complete search history.

(56) References Cited

U.S. PATENT DOCUMENTS

| | | | |
|---|---|---|---|
| 7,827,034 B1 * | 11/2010 | Munns ............... | G09B 5/00 |
| | | | 704/275 |
| 9,106,812 B1 * | 8/2015 | Price ................. | G06F 16/40 |
| 12,039,653 B1 * | 7/2024 | Raya ................. | G06F 40/40 |
| 2024/0001228 A1 * | 1/2024 | Gilg ................. | A63F 13/285 |
| 2024/0354513 A1 * | 10/2024 | Hong ................. | G06N 5/022 |
| 2025/0005300 A1 * | 1/2025 | O'Kelly ............. | G06F 40/205 |

FOREIGN PATENT DOCUMENTS

| | | | | |
|---|---|---|---|---|
| CN | 108549630 B | * | 7/2021 | ............. G06F 40/30 |
| CN | 118138854 A | * | 6/2024 | ......... G06N 30/0475 |

* cited by examiner

*Primary Examiner* — Di Xiao
(74) *Attorney, Agent, or Firm* — Patterson + Sheridan, LLP

(57) ABSTRACT

Embodiments herein relate to generating a video representation text from an article, story, book, magazine, etc. Prompts can be generated to instruct the AI system to output an audio/visual representation of the text. Generating a prompt can include indicating the main subject of the text, the setting of the text, the action performed in the text, among other things. All text from the story can be represented in the video representation. For example, a first group text can be narrated overlaying the video, and a different group of different text can be audibly spoken by AI generated characters. Additionally, a user's interaction with the video can be monitored, and the prompt generation technique can be updated based on the user's interaction.

18 Claims, 3 Drawing Sheets

TEXT-TO-VIDEO CONVERSION

This Application claims the benefit of U.S. Provisional Application 63/640,692 filed on Apr. 30, 2024, which is hereby incorporated by reference.

BACKGROUND

Field

Embodiments of the present invention generally relate to artificial intelligence (AI), more specifically to AI video generation.

Description of the Related Art

AI video generation refers to using AI to create videos from text, images, or other inputs. AI video generation can use deep learning models, such as diffusion models, or generative adversarial networks (GANs) to create visualizations, such as animations.

SUMMARY

According to some embodiments, a method including: receiving text from an article, story, or book; splitting the text into a plurality scenes; splitting each of the scenes into a plurality of beats, where each beat of the plurality of beats represents a change in an action from a previous beat; generating a plurality of prompts for an artificial intelligence (AI) video generating system, where each of the plurality of prompts is associated with a respective one of the plurality of beats, and where each prompt includes: a main subject of the beat; a setting of the beat; an action performed in the beat; receiving a plurality of AI generated videos as a response to the plurality of prompts; and combining the AI generated videos to generate a video representation of the text, where the video representation includes audio corresponding to the text.

According to other embodiments, a system executable by one or more computer processors to perform operations, the operations including: receiving text from an article, story, or book; splitting the text into a plurality scenes; splitting each of the scenes into a plurality of beats, where each beat of the plurality of beats represents a change in an action from a previous beat; generating a plurality of prompts for an artificial intelligence (AI) video generating system, where each of the plurality of prompts is associated with a respective one of the plurality of beats, and where each prompt includes: a main subject of the beat; a setting of the beat; an action performed in the beat; receiving a plurality of AI generated videos as a response to the plurality of prompts; and combining the AI generated videos to generate a video representation of the text, where the video representation includes audio corresponding to the text.

DETAILED DESCRIPTION

Figure 1:
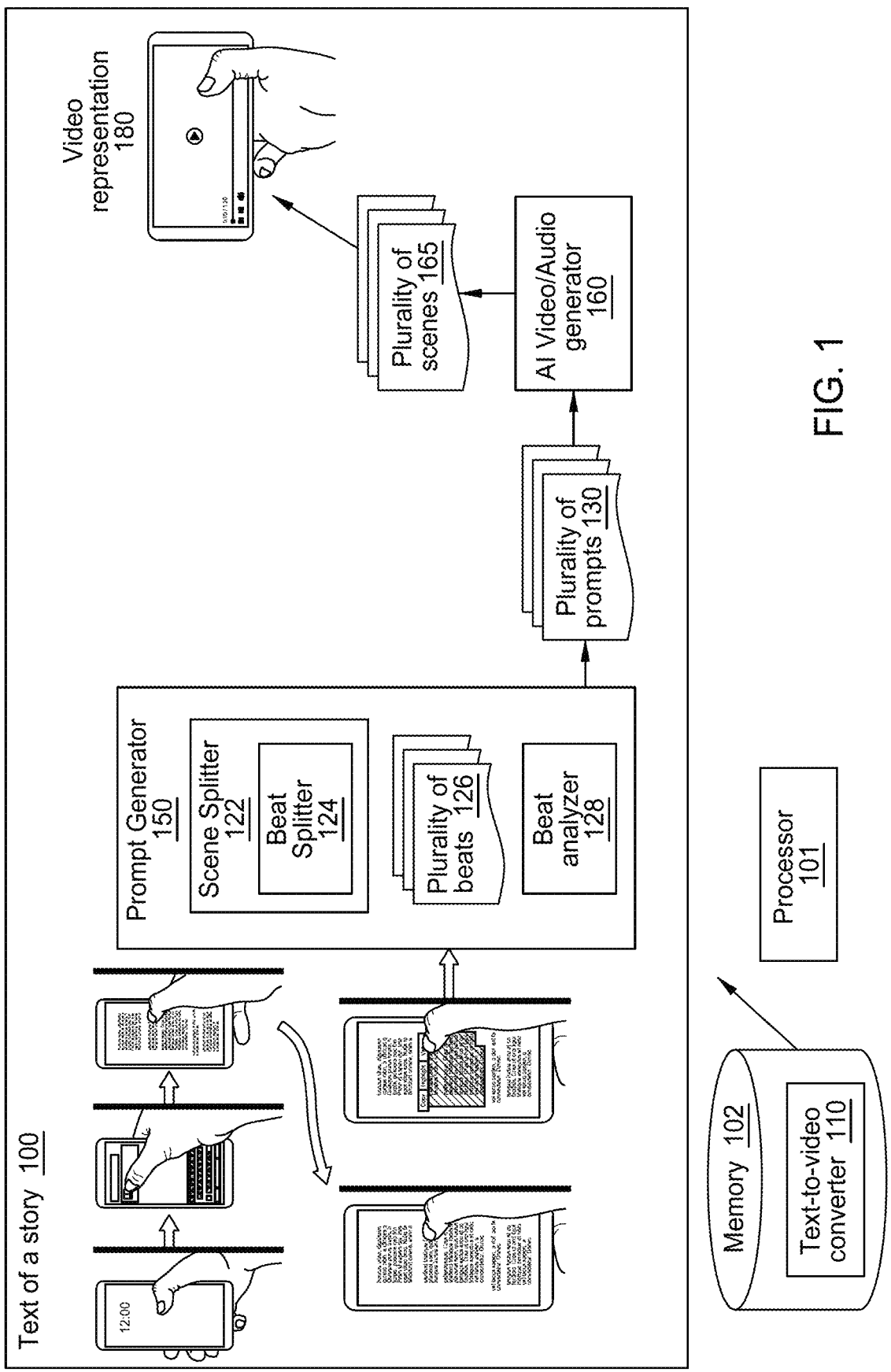
FIG. 1 illustrates a text-to-video generator, according to some embodiments.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Embodiments herein relate to generating a video representation text from an article, story, book, magazine, etc. Text is received and broken down into scenes, and then into beats that make up the scenes. The beats of a scene represent a change in action from a different beat. The beats can be used to generate prompts for an AI video/audio generating system. The prompts can instruct the AI system to output an audio/visual representation of the beat. Generating a prompt from the identified beats may include indicating the main subject of the beat, the setting of the beat, the action performed in the beat, among other things. The outputted video representations of each beat can then be stitched together to create a complete video representation of the text. In one embodiment, all text from the story can be represented in the video representation and can be either spoken by a character in the scene or a narrator. For example, a first portion of the text can be narrated overlaying the video, while the remaining text is audibly spoken by AI generated characters. Additionally, a user's interaction with the video can be monitored, and the prompt generation technique can be updated based on the user's interaction.

To facilitate understanding, identical reference numerals have been used, where possible, to designate identical elements that are common to the figures. It is contemplated that elements and features of one embodiment may be beneficially incorporated in other embodiments without further recitation.

FIG. 1 illustrates the text-to-video converter 110 taking the text of a story and generating a video representation of the text.

The text-to-video converter 110 can be implemented on a computing system with a processor 101, and a memory 102. The processor 101 generally retrieves and executes programming instructions stored in the memory 102. The processor 101 is representative of a single central processing unit (CPU), multiple CPUs, a single CPU having multiple processing cores, graphics processing units (GPUs) having multiple execution paths, specialized AI hardware accelerators (e.g., systems of a chip), and the like.

A CPU can handle tasks that use lower parallelism such as managing the overall workflow, such as loading models, initiating test cases, and delegating tasks to a GPU.

The memory 102 generally includes program code for performing various functions related to use of the text-to-video converter 110. The program code is generally described as various functional "applications" or "modules" within the memory 102, although alternate implementations may have different functions and/or combinations of functions. Within the memory 102, the text-to-video converter 110 facilitates taking written text and representing it in a video format, which includes the text being audibly spoken and represented in the video.

The text of the story 100 is received by the text-to-video converter 110. The text of a story 100 can include text from a nonfiction piece of work, such as a school textbook, a fictional novel or short story, a newspaper article, a magazine article, among other things. The text-to-video converter 110 can receive text of a complete story or book, or text of just a certain part of the story or book, such as the text of a certain page, or the text of a certain chapter, among other things.

The prompt generator 150 of the text-to-video converter 110 analyzes the text of the story 100. Within the prompt generator 150, the scene splitter 122 splits the received text 120 into a plurality of scenes. Scenes can be split by the scene splitter 122 identifying a point in the text 100 where there is a change in a main character, a change in a setting, or a change in an overarching emotion from a previously identified scene.

Within each scene, different beats, or action elements can be recognized by the beat splitter 124. A new beat in a scene can be a new action in a scene that indicates a shift in a dramatic flow from a previous beat. A new beat can be recognized by a change in character behavior, a new character speaking, character emotion, plot progression, or anything else representing a new action. For example, a news article may switch between quotes from two different experts which can be two different beats. Beats can shape the momentum and story progression of the scenes.

The beat analyzer 128 analyzes each of the plurality of beats 126 split by the beat splitter 124. The beat analyzer 128 analyzes each beat to determine aspects such as a main subject of the beat, a setting of the beat, an action performed in the beat, a camera movement of the beat, an aesthetic atmosphere of the beat, among other things. Upon determining these aspects of the beat, the beat analyzer generates a plurality of prompts 130 for an AI video/audio generator 160 to consider. In one embodiment, each of the plurality of prompts is associated with a respective one of the plurality of beats 126 split by the beat splitter 124. The prompts can be generated using natural language processing (NLP).

The AI video generator 160 can generate a video per prompt. The outputted videos can be combined into a plurality of scenes 165, and the plurality of scenes can be combined into a video representation 180 of the text 100.

In one embodiment, the video representation 180 of the text 100 includes all of the text of the story 100, but this is not a requirement. The video representation 180 can be an animation of varying degrees of lifelike qualities. For example, the video representation 180 can be a cartoonish animation or a very lifelike animation. The text 100 can be represented within the video representation 180 as narration, or as dialogue spoken by characters, among other ways.

The video representation 180 can contain subtitles of the represented text 100. The word spacing, font, and color contrast of the subtitles can be generated in line with principals for dyslexia accessibility. For example, a certain font style with a high color contrast that avoids a pure white background, preventing glare, can be more beneficial to someone with Dyslexia than a different, more cursive-like font of a color that is more likely to create a glare.

Scene splitter 122 can use NLP to take the text 100 and split it into scenes. The scene splitter 122 can process breaks in the text, such as chapter breaks, transition phrases such as "meanwhile" or "later that day," or other indicators of a shift in the text 100 that constitutes a new scene.

Once the scenes of the text 100 have been identified, the beat splitter 124 can also use NLP to analyze where in the text of the split scenes new action elements are located, where a new action element indicates a new beat, etc. The beat splitter 124 can identify new beats in a scene outputted by the scene splitter 122 by analyzing the sentence structure, action verbs, emotional tone, among other things in the scene. Analyzing the text of the scenes to identify new beats can involve sentiment analysis, among other techniques. Changes in dialogue flow, pacing (e.g. the length of a sentence), trigger words (e.g. "suddenly," or "instantly") can indicate a change in a scene's rhythm to the beat splitter 124.

The plurality of beats 126 outputted by the beat splitter 124 can be used by the beat analyzer 128 to generate a plurality of prompts 130 for the AI video/audio generator 160.

The beat analyzer 128 analyzes the text that makes up each of the plurality of beats 126. In some embodiments, an algorithm is applied to each of the plurality of beats 126 by the beat analyzer 128. The algorithm can identify aspects of each of the plurality of beats, such as a main subject of the beat, a setting of the beat, an action performed in the beat, a camera movement of the beat, an aesthetic atmosphere of the beat, among other things, and generate a machine readable prompt. Each of the plurality of machine readable prompts 130 can include the identified aspects of the beats. Including these aspects in the prompts, among other aspects, enables the AI video/audio generator to depict the text 100 in an accurate and holistic manner, encompassing more nuance than would be otherwise encompassed by a generic prompt. More detail on the beat analyzer 128 is provided in FIG. 2.

The AI video/audio generator 160 reads each of the plurality of prompts 130 and outputs an AI generated video in response to each of the plurality of prompts 130. The AI generated videos representing the beats can be stitched together to form a plurality of scenes 165, and the plurality of scenes come together to form the video representation 180 of the text 100.

Figure 2:
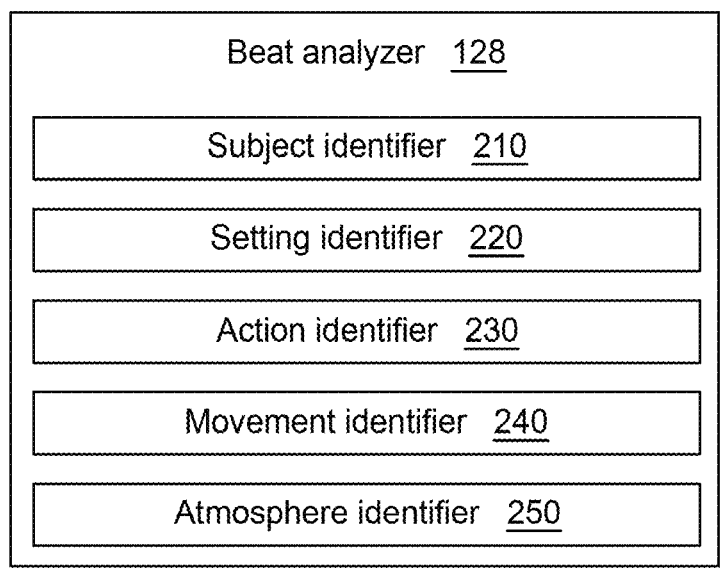
FIG. 2 illustrates a beat analyzer, according to some embodiments.

FIG. 2 illustrates the beat analyzer 128 and its components.

The beat analyzer 128 includes a subject identifier 210, a setting identifier 220, an action identifier 230, a movement identifier 240 and an atmosphere identifier 250. As discussed in FIG. 1, the beat analyzer 128 receives the plurality of beats 126 outputted from the beat splitter 124. Each of the listed identifiers can apply NPL to identify language that indicates certain aspects of the received beat.

The subject identifier 210 analyzes the text of a beat provided by the beat splitter 124 and identifies the subject of the beat. The subject identifier 210 can use NLP to identify named entities in the text, pronouns, etc. The subject identifier 210 can refer to other beats of text to determine a subject that may be referenced in the current beat being analyzed.

The setting identifier 220 can use NLP to identify the setting of a beat by analyzing prepositional phrases in the beat(s), named locations, named entities within locations, etc. Named entity recognition (NER) is a technique that can be employed to detect place names (e.g. "a house" or "a park"). Dependency parsing is another technique that can be used to identify spatial relationships in sentences (e.g. "the girl walked into the house.") Previously identified settings in other beats can also be tracked to infer the setting of the current beat being analyzed in the ongoing scene.

The action identifier 230 can identify an action being performed in a beat. In some embodiments, the action identifier 230 implements NLP to identify the action being performed in the beat using part-of-speech-tagging, which is a technique that detects verbs or phrases that indicate a movement or change. Furthermore, dependency parsing can also be used to help link the relationship between subject of the beat and an action being performed by the subject. NLP can also categorize verbs, such as physical actions versus emotional actions, to classify the type of action in the beat.

The movement identifier 240 can identify movement of a beat. In some embodiments, the movement identifier 240 uses NLP to detect action verbs. The NLP used in the movement identifier 240 can analyze the text for prepositional phrases, or directional cues such as "toward," "into," or "away from," among other things. Sentence structure of the beats can also be analyzed for implicit motion cues based on context.

Similar, to the other components of the beat analyzer 128, the atmosphere identifier 250 can use NLP to identify certain phrases or words in the text that indicate the mood or aura of the beat. For example, words such as "eerie" or "bright" highlight a particular mood or atmosphere of the beat.

The beat analyzer 128 is not limited to including the above mentioned identifiers.

Figure 3:
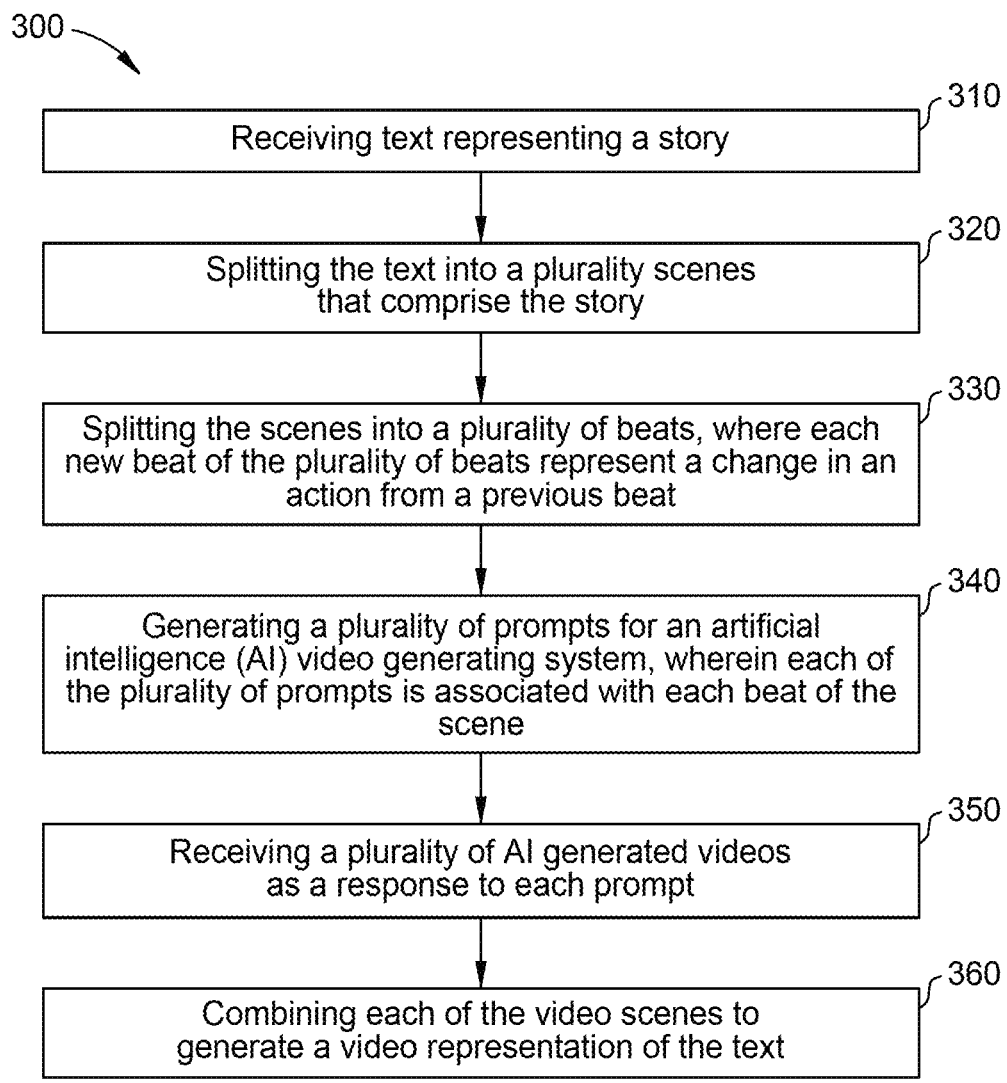
FIG. 3 illustrates a flow diagram of generating a video representation of text, according to some embodiments.

FIG. 3 illustrates a flow diagram 300 for generating video representation of text.

At block 310, the text-to-video converter 110 receives text. The text, such as the text of the story 100, can be text of an entire story, newspaper article, magazine article, screenplay, etc. The text can also be text of a certain chunk from a larger piece of work, such as a paragraph of a magazine article, or chapter of a story. The text can be received via a digital scan, a photograph, a file, among other things.

At block 320 the scene splitter 122 splits the text into a plurality of scenes. As mentioned, the scene splitter can use NLP to identify changes in settings, or other indicators that contribute to a new scene.

At block 330 the beat splitter 124 of the scene splitter 122 splits the scenes into a plurality of beats. As discussed in FIG. 2, the beat splitter 124 identifies a new beat in a scene, which can be a new action in a scene that indicates a shift in a dramatic flow. A new beat can be recognized by a change in character behavior, character emotion, plot progression, or anything else representing a new action. Beats can shape the momentum and story progression of the scenes.

At block 340 the prompt generator 150 generates a plurality of prompts for an AI video generating system, where each of the plurality of prompts is associated with each beat of the scene.

As discussed in FIG. 2, the beat analyzer 128 of the prompt generator 150 takes the beats from the beat splitter 124 and analyzes each beat, identifying different elements that make up the beat. For example, the beat analyzer 128 can identify the subject of each beat, the setting of each beat, the action occurring in each beat, the movement that is occurring in each beat, and the aesthetic atmosphere of each beat, among other things. FIG. 2 provides details on the components of the beat analyzer that identify the above-mentioned elements.

Using the information from the beat analyzer, the prompt generator 150 outputs a separate prompt for each beat. The prompt is for an AI video/audio generator, such as the AI video/audio generator 160, and each prompt corresponds to each beat split by the beat splitter 124. Each prompt also contains the elements identified by the beat analyzer, and is formatted such that an AI video/audio generator can output a video of the beat.

At block 350 the AI video/audio generator 160 outputs AI generated videos. In some embodiments, the AI video/audio generator outputs the AI videos and audio together, whereas in other embodiments, the video and audio outputs are separate. The AI video/audio generator may include separate components, where the separate components specialize in different aspects of video generation (i.e. the animation or the audio).

At block 360 the text-to-video converter 110 combines each of the plurality of videos that are outputted in response to the received prompts, to form a final video representation of the text 100. The text-to-video converter 110 can employ various video editing and processing techniques to generate a single video from the plurality of outputted videos that correspond to each prompt. For example, the text-to-video converter 110 can arrange the individual videos of the beats in a sequential manner (e.g. based on timestamps, scene continuity from the text, etc.) and add transitions, such as fades or cuts to ensure a smooth flow between clips. Additionally, the text-to-video generator can implement techniques that ensure the audio synchronization maintains consistent sound levels throughout the video, among other things that ensure continuity between video clips.

As mentioned in FIG. 1, the video representation represents all text 100. The video representation can contain subtitles of the represented text. The subtitles' word spacing, font, and color contrast of the can be generated in line with principals for dyslexia accessibility.

Additionally, the final video representation 180 video can include dynamic cinematography elements based on the elements of the prompts, such as panning, tracking shots, and zoom effects.

Figure 4:
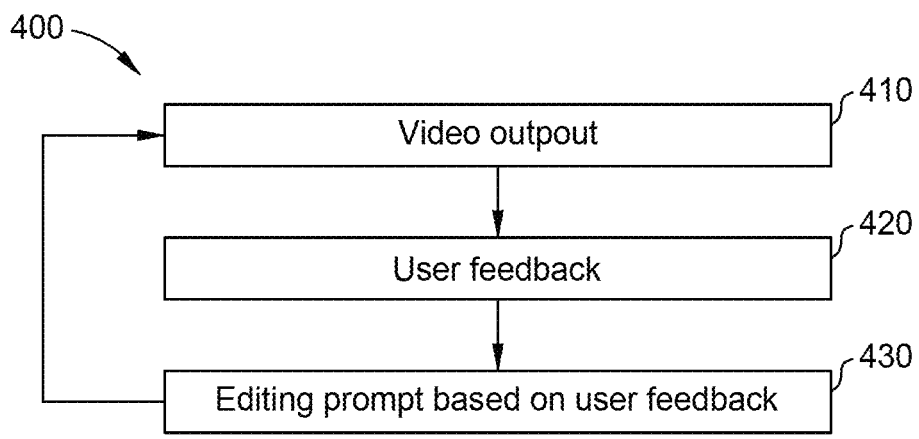
FIG. 4 illustrates a flow diagram for updating prompt generating parameters, according to some embodiments.

FIG. 4 illustrates a flow diagram 400 of the text-to-video converter 110 updating parameters of the beat analyzer 128 according to how a user interacts with the video representation of the text.

At block 410 the text-to-video converter 110 produces the video output. As mentioned, the video output can include subtitles, and includes all text 100 audibly spoken in the video. Some text can be represented in the video representation as narration whereas other text can be represented in the video as a character animated speaking words.

At block 420, the text-to-video converter 110 receives user feedback. User feedback includes data from monitoring a user's interaction with the video representation 180, including identifying points of issue a user may have with the video representation 180. For example, user feedback can include a monitored interaction where the user pauses the video for a certain duration of time at a certain beat of a certain scene in the video representation 180. Another example of user feedback can include a monitored interaction where the user asks a question about the video representation through a GUI provided in the video representation. Another example of user feedback can include a monitored integration were the user rewinds the video representation a certain number of times.

At block 430, the user feedback is analyzed, and the parameters of the prompt generator 150 are updated based on the user feedback. For example, the prompt generator 150 can recognize that a video segment corresponding to a certain beat has been rewound multiple times. After recognizing this, the prompt generator 150 can update its parameters to reword the prompt, so that the AI/Video audio generator 160 can output a more digestible video for the user. After rewording the prompt, a new video representation 180 can be generated, and user interaction can be monitored to determine whether the user still rewinds at that certain part of the video. The parameters of the prompt generator 150 can be consistently updated until the prompt leads to a video representation 180 that a user is comfortable with.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method comprising:
  receiving text from an article, story, or book;
  splitting the text into a plurality of beats, wherein each beat of the plurality of beats represents a change in an action from a previous beat;
  generating a plurality of prompts for an artificial intelligence (AI) video generating system, wherein each of the plurality of prompts is associated with a respective one of the plurality of beats, and wherein each prompt comprises:
    a main subject of the beat;
    a setting of the beat;
    an action performed in the beat;
  receiving a plurality of AI generated videos as a response to the plurality of prompts; and
  combining the AI generated videos to generate a video representation of the text, wherein the video representation includes audio corresponding to the text, wherein the video representation contains subtitles of the represented text, wherein the text spacing, font, and color contrast of the subtitles are generated in line with principals for dyslexia accessibility.

2. The method of claim 1, wherein all of the text representing the story is audibly spoken in the audio of the video representation.

3. The method of claim 2, wherein a first portion of the text is represented in the video as a narration, and wherein a second portion of the text is represented in the video as an AI generated character speaking the second portion of the text.

4. The method of claim 1, wherein the plurality of prompts are generated using natural language processing (NLP) of the text representing the story.

5. The method of claim 1, wherein splitting the text into the plurality of beats comprises:
 splitting the text into a plurality of scenes and then splitting the plurality of scenes into the plurality of beats, wherein splitting the text into a plurality of scenes comprises:
  identifying a point in the text where there is a change in a main character, a change in a setting, or a change in an overarching emotion from a previously identified scene.

6. The method of claim 1 further comprising:
 monitoring a user's interaction with the video representation of the text;
 determining at least one point of issue for the user; and
 generating a second plurality of prompts for an artificial intelligence (AI) video generating system, wherein the second plurality of prompts includes a solution to the at least one point of issue.

7. The method of claim 1, wherein each prompt further comprises:
 a camera movement of the beat;
 an aesthetic atmosphere of the beat; and
 the text of the story that comprises the beat.

8. A method comprising:
 receiving text from an article, story, or book;
 splitting the text into a plurality of beats, wherein each beat of the plurality of beats represents a change in an action from a previous beat;
 generating a plurality of prompts for an artificial intelligence (AI) video generating system, wherein each of the plurality of prompts is associated with a respective one of the plurality of beats, and wherein each prompt comprises:
  a main subject of the beat;
  a setting of the beat;
  an action performed in the beat;
 receiving a plurality of AI generated videos as a response to the plurality of prompts; and
 combining the AI generated videos to generate a video representation of the text, wherein the video representation includes audio corresponding to the text, wherein the video representation comprises dynamic cinematography elements based on the elements of the prompts, wherein the dynamic cinematography elements comprise:
  panning;
  tracking shots; and
  zoom effects.

9. A method comprising:
 receiving text from an article, story, or book;
 splitting the text into a plurality of beats, wherein each beat of the plurality of beats represents a change in an action from a previous beat;
 generating a plurality of prompts for an artificial intelligence (AI) video generating system, wherein each of the plurality of prompts is associated with a respective one of the plurality of beats, and wherein each prompt comprises:
  a main subject of the beat;
  a setting of the beat;
  an action performed in the beat;
 receiving a plurality of AI generated videos as a response to the plurality of prompts;
 combining the AI generated videos to generate a video representation of the text, wherein the video representation includes audio corresponding to the text;
 monitoring a user's interaction with the video representation of the text;
 determining at least one point of issue for the user; and
 generating a second plurality of prompts for an artificial intelligence (AI) video generating system, wherein the second plurality of prompts includes a solution to the at least one point of issue, wherein the at least one point of issue comprises:
  a monitored interaction where the user pauses for a certain duration of time;
  a monitored interaction where the user asks a question about the video representation through a GUI; and
  a monitored interaction where the user rewinds the video representation a certain number of times.

10. A system comprising:
 memory; and
 one or more computer processors configured to execute an application stored in the memory to perform operations, the operations comprising:
  receiving text from an article, story, or book;
  splitting the text into a plurality of beats, wherein each beat of the plurality of beats represents a change in an action from a previous beat;
  generating a plurality of prompts for an artificial intelligence (AI) video generating system, wherein each of the plurality of prompts is associated with a respective one of the plurality of beats, and wherein each prompt comprises:
   a main subject of the beat;
   a setting of the beat;
   an action performed in the beat;
  receiving a plurality of AI generated videos as a response to the plurality of prompts; and
  combining the AI generated videos to generate a video representation of the text, wherein the video representation includes audio corresponding to the text, wherein the video representation contains subtitles of the represented text, wherein the text spacing, font, and color contrast of the subtitles are generated in line with principals for dyslexia accessibility.

11. The system of claim 10, wherein all of the text representing the story is audibly spoken in the audio of the video representation.

12. The system of claim 11, wherein a first portion of the text is represented in the video as a narration, and wherein a second portion of the text is represented in the video as an AI generated character speaking the second portion of the text.

13. The system of claim 10, wherein the plurality of prompts are generated using natural language processing (NLP) of the text representing the story.

14. The system of claim 10, wherein splitting the text into the plurality of beats comprises:

splitting the text into a plurality of scenes and then splitting the plurality of scenes into the plurality of beats, wherein splitting the text into a plurality of scenes comprises:
identifying a point in the text where there is a change in a main character, a change in a setting, or a change in an overarching emotion from a previously identified scene.

15. The system of claim 10 further comprising:
monitoring a user's interaction with the video representation of the text;
determining at least one point of issue for the user; and
generating a second plurality of prompts for an artificial intelligence (AI) video generating system, wherein the second plurality of prompts includes a solution to the at least one point of issue.

16. The system of claim 10, wherein each prompt further comprises:
a camera movement of the beat;
an aesthetic atmosphere of the beat; and
the text of the story that comprises the beat.

17. A system comprising:
memory; and
one or more computer processors configured to execute an application stored in the memory to perform operations, the operations comprising:
receiving text from an article, story, or book;
splitting the text into a plurality of beats, wherein each beat of the plurality of beats represents a change in an action from a previous beat;
generating a plurality of prompts for an artificial intelligence (AI) video generating system, wherein each of the plurality of prompts is associated with a respective one of the plurality of beats, and wherein each prompt comprises:
a main subject of the beat;
a setting of the beat;
an action performed in the beat;
receiving a plurality of AI generated videos as a response to the plurality of prompts; and
combining the AI generated videos to generate a video representation of the text, wherein the video representation includes audio corresponding to the text, wherein the video representation comprises dynamic cinematography elements based on the elements of the prompts, wherein dynamic cinematography elements comprise:
panning;
tracking shots; and
zoom effects.

18. A system comprising:
memory; and
one or more computer processors configured to execute an application stored in the memory to perform operations, the operations comprising:
receiving text from an article, story, or book;
splitting the text into a plurality of beats, wherein each beat of the plurality of beats represents a change in an action from a previous beat;
generating a plurality of prompts for an artificial intelligence (AI) video generating system, wherein each of the plurality of prompts is associated with a respective one of the plurality of beats, and wherein each prompt comprises:
a main subject of the beat;
a setting of the beat;
an action performed in the beat;
receiving a plurality of AI generated videos as a response to the plurality of prompts;
combining the AI generated videos to generate a video representation of the text, wherein the video representation includes audio corresponding to the text;
monitoring a user's interaction with the video representation of the text;
determining at least one point of issue for the user; and
generating a second plurality of prompts for an artificial intelligence (AI) video generating system, wherein the second plurality of prompts includes a solution to the at least one point of issue, wherein the at least one point of issue comprises:
a monitored interaction where the user pauses for a certain duration of time; a monitored interaction where the user asks a question about the video representation through a GUI; and
a monitored interaction where the user rewinds the video representation a certain number of times.

* * * * *